United States Patent
Liu (10) Patent No.: US 9,998,817 B1
(45) Date of Patent: Jun. 12, 2018

(54) ON HEAD DETECTION BY CAPACITIVE SENSING BCT

(71) Applicant: Google LLC, Mountain View, CA (US)

(72) Inventor: Jianyi Liu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 14/959,239

(22) Filed: Dec. 4, 2015

(51) Int. Cl.
*H04R 25/00* (2006.01)
*H04R 1/10* (2006.01)

(52) U.S. Cl.
CPC ....... *H04R 1/1091* (2013.01); *H04R 2460/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,045,727 B2 * | 10/2011 | Philipp | ................ | H04R 1/1041 381/370 |
| 8,630,425 B2 * | 1/2014 | Chang | .................. | H04R 1/1016 381/71.1 |
| 8,842,870 B2 * | 9/2014 | East | .................... | H04R 1/1066 381/173 |
| 9,043,211 B2 | 5/2015 | Haiut et al. | | |
| 9,094,764 B2 | 7/2015 | Rosener | | |
| 9,554,223 B2 * | 1/2017 | Hillbratt | .............. | H04R 25/606 |
| 2002/0039427 A1 | 4/2002 | Whitwell et al. | | |
| 2014/0363033 A1 | 12/2014 | Heiman et al. | | |
| 2015/0201065 A1 | 7/2015 | Shim et al. | | |
| 2015/0268475 A1 | 9/2015 | Lee et al. | | |

FOREIGN PATENT DOCUMENTS

WO    2008123667 A1    10/2008

\* cited by examiner

*Primary Examiner* — Amir Etesam
(74) *Attorney, Agent, or Firm* — McDonnell Boehnen Hulbert & Berghoff LLP (57) ABSTRACT

The present application describes on-head detection by a capacitive sensing bone conduction transducer (BCT) system and applications thereof. An example apparatus includes a wearable computing device comprising: (1) the BCT comprising a transducer coupled to a BCT frame, wherein (a) the BCT frame couples the BCT to a component of the wearable computing device, (b) at least a portion of the BCT frame is conductive, wherein the conductive portion of the BCT frame is arranged to capacitively couple the BCT to a wearer when the wearable computing device is worn, and (c) the BCT is configured to receive and be driven by an audio signal; (2) a capacitive sensor controller; and (3) at least one connective component that further couples the conductive portion of the BCT frame to the capacitive sensor controller.

20 Claims, 7 Drawing Sheets

ON HEAD DETECTION BY CAPACITIVE SENSING BCT

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a wearer as they go about various aspects of their everyday life. Such computing devices, which are referred to as wearable computing devices, are configured to sense and analyze a wearer's environment and to provide information intelligently, as appropriate to the physical world being experienced by the wearer. In order to extend battery life, a wearable computing device may use a sensing mechanism to automatically detect whether the device is donned or doffed (i.e., whether or not the device is being worn).

SUMMARY

In one aspect, an example method is disclosed that includes, detecting, via a wearable computing device, data indicating a level of capacitance between a bone conduction transducer (BCT) and a surrounding medium. The method further includes: receiving data indicating the detected level of capacitance between the BCT and the surrounding medium; comparing the received data with a threshold capacitance level; and based on the comparison, providing an indication. The method may provide the indication that the wearable computing device is donned. In such case, the indication may cause the wearable computing device to operate in a first state. Additionally, the method may provide the indication that the wearable computing device is doffed. In such case, the indication may cause the wearable computing device to operate in a second state, wherein the wearable computing device consumes less power in the second state than in the first state.

In yet another aspect, a non-transitory computer-readable medium is disclosed having stored therein instructions executable by a computing device to cause the computing device to perform the example method described above.

In still another aspect, a wearable computing device is disclosed that comprises: (1) a bone conduction transducer (BCT) comprising a transducer coupled to a BCT frame, wherein (a) the BCT frame couples the BCT to a component of the wearable computing device, (b) at least a portion of the BCT frame is conductive, wherein the conductive portion of the BCT frame is arranged to capacitively couple the BCT to a wearer when the wearable computing device is worn, and (c) the BCT is configured to receive and be driven by an audio signal; (2) a capacitive sensor controller; and (3) at least one connective component that further couples the conductive portion of the BCT frame to the capacitive sensor controller, wherein the BCT coupled to the conductive portion of the BCT frame detects a level of capacitance between the BCT and a surrounding medium. The capacitive sensor controller may be configured to: (1) receive data indicating the detected level of capacitance between the BCT and the surrounding medium; (2) compare the received data with a threshold capacitance level; and (3) based on the comparison, provide an indication to the wearable computing device.

These as well as other aspects, advantages, and alternatives, will become apparent to those of ordinary skill in the art by reading the following detailed description, with reference where appropriate to the accompanying drawings.

DETAILED DESCRIPTION

The following detailed description describes various features and functions of the disclosed systems and methods with reference to the accompanying Figs. In the Figs, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. OVERVIEW

A wearable computing device may be configured to execute any number of functions, such as displaying information on a display of the wearable computing device, communicating with one or more other devices, emitting audio, visual, and/or haptic notifications, receiving inputs, and sensing an environment around the wearable computing device. In performing these functions, the wearable computing device may consume battery power supplied by one or more batteries in the wearable computing device.

In order to conserve power on the wearable computing device and, in turn, improve the battery life of the wearable computing device, it may be desirable for the wearable computing device to occasionally switch from a first state to a second state in which the wearable computing device consumes less power than in the first state. While there are many sensing mechanisms that may be used to achieve this end, the use of additional hardware, switches, or dedicated sensors can be problematic for low power wearable computing devices, which often require a battery having a small form factor.

Accordingly, example embodiments may help extend battery life of a wearable computing device and possibly other devices without requiring additional sensor(s) to detect when the device is being worn. For example, a bone conduction speaker (e.g., a bone conduction transducer or "BCT") of a wearable computing device may be used as a sensing mechanism, in addition to its typical use as an audio mechanism.

An illustrative wearable computing device may include an earpiece with a BCT. A BCT may be operable to vibrate the wearer's bone structure at a location where the vibrations travel through the wearer's bone structure to the middle ear, such that the brain interprets the vibrations as sounds. The wearable computing device may take the form of an earpiece with a BCT, which can be tethered via a wired or wireless interface to a wearer's phone, or may be a standalone earpiece device with a BCT. Alternatively, the wearable computing device may be a glasses-style wearable device that includes one or more BCTs and has a form factor that is similar to traditional eyeglasses.

In any such wearable computing device, a BCT may be arranged on the wearable computing device so as to contact the back of the wearer's ear. For instance, the BCT may be located on a hook-like section of a wearable computing device, which extends behind a wearer's ear and helps to keep the device in place. In such an arrangement, the BCT may be located on the device such that the BCT contacts the back of the wearer's ear (e.g., at the auricle) when the device is worn. Note that in such an arrangement and possibly other arrangements as well, the BCT may vibrate the wearer's cartilage and/or bone structure. Vibrating the wearer's cartilage may transfer sound to the inner ear. The placement of the BCT against the back of a wearer's ear may be more discrete because it may hide much of the device from view. As a result, such an arrangement may be considered more socially acceptable and/or more aesthetically desirable. Further, a behind-ear arrangement of a BCT may provide for higher sound quality/fidelity. Additionally or alternatively, the BCT may include a flexible pad that contacts the back of the wearer's ear or is arranged such that the flexible pad helps transfer vibrations from the BCT to the wearer's bone structure.

Additionally, the BCT may include a BCT frame that is rigid, couples the BCT, and holds the BCT, the flexible pad, and additional components of the BCT together. The BCT frame may be arranged so as to contact the wearer or is in close proximity to the wearer when the device is worn. The BCT frame or a portion of the BCT frame may be constructed with any conductive material, such as steel, alloy, aluminum, or iron, among others.

The conductive portion of the BCT frame may also be coupled to a capacitive sensor controller. For example, a micro-coaxial cable may be used to couple the conductive portion of the BCT frame to a pin or port of the capacitive sensor controller. The capacitive sensor controller may be configured to detect a level of capacitance, receive the detected level of capacitance, compare the received level of capacitance to a threshold level of capacitance, and provide an indication to the wearable computing device based on the comparison.

By coupling the conductive portion of the BCT frame to the pin or port of the capacitive sensor controller that is configured to detect a level of capacitance, the conductive portion of the BCT frame may sense or detect the level of capacitance between the BCT (or conductive portion of the BCT frame) and a surrounding medium, such as a head of a wearer when the device is worn. The level of capacitance sensed or detected from the conductive portion of the BCT frame may be received by the capacitive sensor controller. The capacitive sensor controller may then compare the level of capacitance to the threshold capacitance level. Based on the comparison, the capacitive sensor controller may provide an indication to the wearable computing device. For example, the capacitive sensor controller may provide an indication that the wearable computing device is worn.

2. EXAMPLES OF WEARABLE COMPUTING DEVICES

Systems and devices in which exemplary embodiments may be implemented will now be described in greater detail. However, an exemplary system may also be implemented in or take the form of other devices, without departing from the scope of the invention.

Figure 1A:
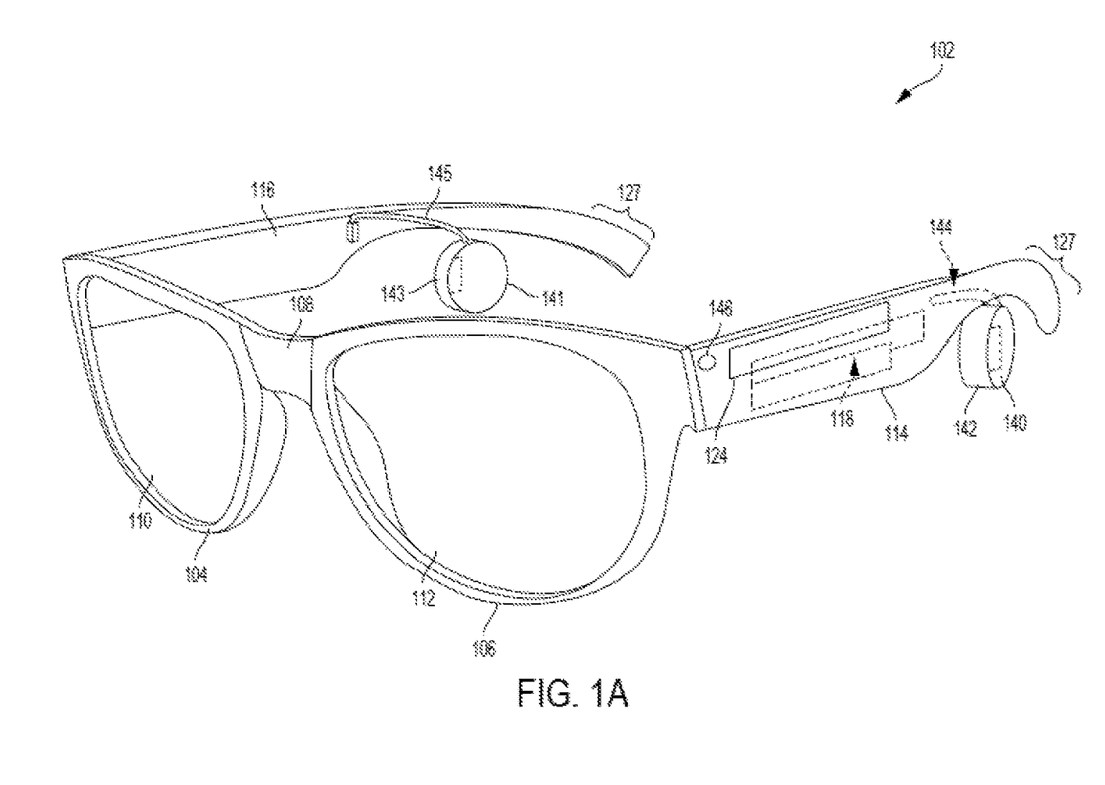
FIG. 1A and FIG. 1B illustrate wearable computing devices in the form of glasses-style wearable devices, in accordance with example embodiments.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices, without departing from the scope of the invention. As illustrated in FIG. 1A, the wearable computing device 102 comprises frame elements including lens-frames 104, 106 and a center frame support 108, lens elements 110, 112, and extending side-arms 114, 116. The center frame support 108 and the extending side-arms 114, 116 are configured to secure the wearable computing device 102 to a user's head via placement on a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a wearer's ears to secure the HMD 102 to the wearer's head. The extending side-arms 114, 116 may further secure the HMD 102 to the wearer by extending around a rear portion of the wearer's head. Additionally or alternatively, for example, the HMD 102 may connect to or be affixed within a wearable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of HMD 102 or may be positioned remotely from and communicatively coupled to a head-mountable component of a computing device (e.g., the on-board computing system 118 could be housed in a separate component that is not head wearable, and is wired or wirelessly connected to a component that is head wearable). The on-board computing system 118 may include a processor and memory, for example. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 could include an inertial measurement unit (IMU)

(not explicitly shown in FIG. 1A), which provides an accelerometer, gyroscope, and/or magnetometer. In some embodiments, an HMD 102 could also include an accelerometer, a gyroscope, and/or a magnetometer that is not integrated in an IMU.

HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranges at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In a further aspect, earpiece 140 and 141 are attached to side-arms 114 and 116, respectively. Earpieces 140 and 141 can each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, earpieces 140, 141 may be arranged such that a respective BCT 142, 143 can contact the auricle of both of the wearer's ear. Additionally or alternatively, BCT 142, 143 may include a flexible pad (not shown) that may be arranged such that the flexible pad can contact the wearer's ear. Other arrangements of earpieces 140, 141 are also possible. Further, embodiments with a single earpiece 140 or 141 are also possible.

In an exemplary embodiment, a BCT, such as BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, HMD 102 may include at least one audio source (not shown) that is configured to provide an audio signal that drives BCT 142 and/or BCT 143. For instance, in an exemplary embodiment, an HMD 102 may include an internal audio playback device such as an on-board computing system 118 that is configured to play digital audio files. Additionally or alternatively, an HMD 102 may include an audio interface to an auxiliary audio playback device (not shown), such as a portable digital audio player, a smartphone, a home stereo, a car stereo, and/or a personal computer, among other possibilities. In some embodiments, an application or software-based interface may allow for the HMD 102 to receive an audio signal that is streamed from another computing device, such as the wearer's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
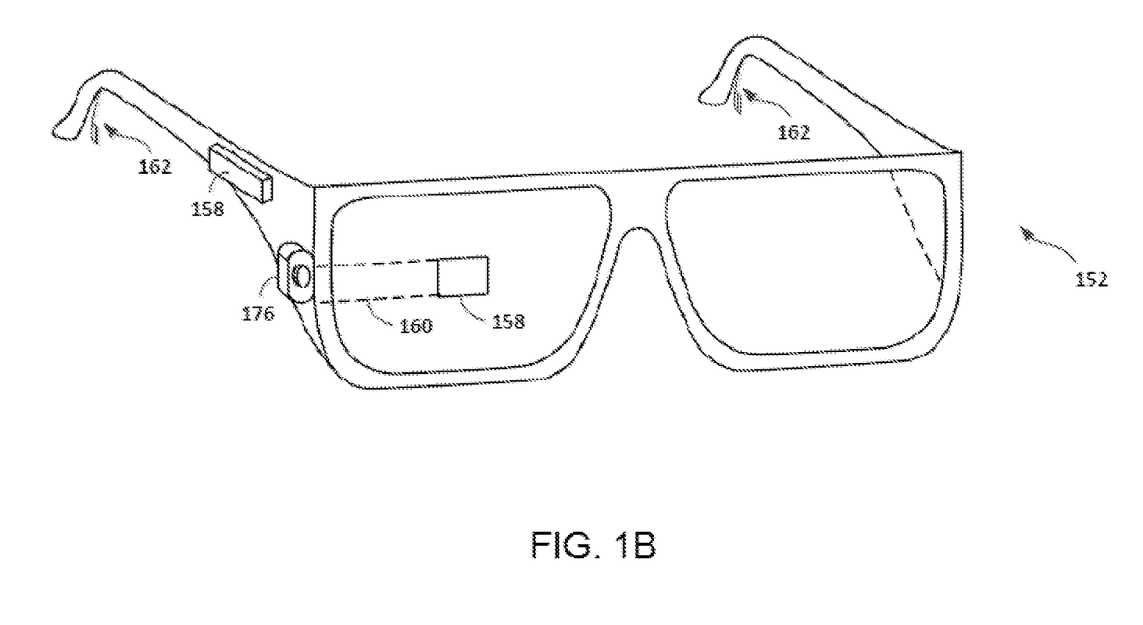

Note that in the example shown in FIG. 1A, HMD 102 does not include a graphical display. FIG. 1B shows another wearable computing device 152 according to an example embodiment, which is similar to the HMD 102 shown in FIG. 1A but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, and a microphone 176 that is configured and functions similarly to microphone 146. HMD 152 may additionally or alternatively include other components, which are not shown in FIG. 1B.

HMD 152 includes a single graphical display 158, which may be coupled to the on-board computing system 158, to a standalone graphical processing system, and/or to other components of HMD 152. The display 158 may be formed on one of the lens elements of the HMD 152, such as a lens element described with respect to FIG. 1A, and may be configured to overlay computer-generated graphics in the wearer's field of view, while also allowing the wearer to see through the lens element and concurrently view at least some of their real-world environment. (Note that in other embodiments, a virtual reality display that substantially obscures the wearer's view of the physical world around them is also possible.) The display 158 is shown to be provided in a center of a lens of the HMD 152, however, the display 158 may be provided in other positions, and may also vary in size and shape. The display 158 may be controllable via the computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, such as an electroluminescent display or a liquid crystal display, one or more waveguides for delivering an image to the wearer's eyes, or other optical elements capable of delivering an in focus near-to-eye image to the wearer. A corresponding display driver may be disposed within the frame of the HMD for driving such a matrix display. Alternatively or additionally, a laser or LED source and scanning system could be used to draw a raster display directly onto the retina of one or more of the wearer's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

Figure 2:
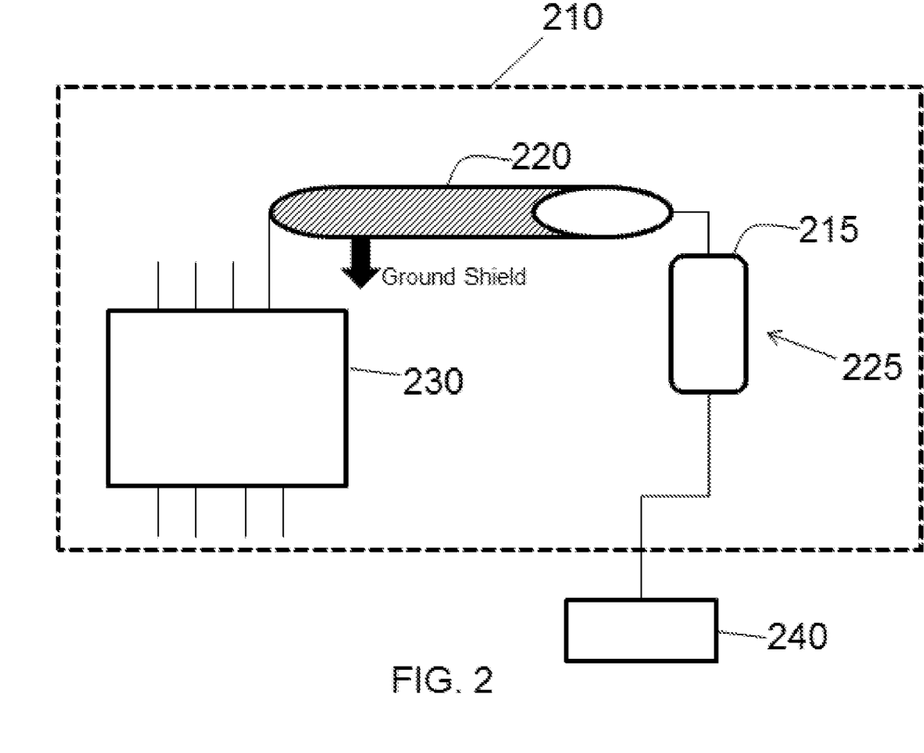
FIG. 2 is a simplified internal block diagram of how a BCT of a wearable computing device may operate as both a bone-conduction speaker and a capacitive sensor, in accordance with an example embodiment.

FIG. 2 shows a simplified internal block diagram of how a BCT of a wearable computing device may operate as both a bone-conduction speaker and a capacitive sensor, in accordance with an example embodiment. In addition to operating as a bone-conduction speaker, a BCT, such as BCT 142 and/or BCT 143 in FIG. 1A, may also operate as a capacitive sensor that detects whether HMD 102 (FIG. 1A) is donned or doffed (i.e., whether or not the device is being worn or not).

In particular, BCTs 142 and/or 143 in FIG. 1A may be configured in the form of BCT 225 in FIG. 2. BCT 225 may be configured to receive an audio signal from an internal or auxiliary audio playback device 240 that drives BCT 225. Additionally, BCT 225 may detect a level of capacitance between the wearer and the HMD 102 or 152, via a capacitive sensor controller 230 that is coupled to a conductive portion of a BCT frame 215, when the HMD 102 or 152 is worn.

The BCT frame 215 may be rigid and may hold the BCT 225, a flexible pad (not shown), and additional components of BCT 225 together. The BCT frame 215 may be arranged so as to contact the wearer or is in close proximity to the wearer when HMD 102 or 152 is worn. The BCT frame 215 or a portion of the BCT frame 215 may be constructed with any conductive material, such as steel, alloy, aluminum, or iron, among others.

A micro-coaxial cable 220 may be used to couple the capacitive sensor controller 230 to the conductive portion of the BCT frame 215. For example, the micro-coaxial cable 220 may couple the conductive portion of the BCT frame 215 to a pin or port of the capacitive sensor controller 230. The capacitive sensor controller 230 may be configured to detect a level of capacitance, receive the detected level of capacitance, and compare the received level of capacitance to a threshold level of capacitance.

By coupling the conductive portion of the BCT frame 215 to the pin or port of the capacitive sensor controller 230 that is configured to detect a level of capacitance, the conductive portion of the BCT frame 215 may sense or detect a level of capacitance between the BCT 225 (or the conductive portion of the BCT frame 215) and a surrounding medium, such as air and/or a nearby conductor, such as a head of a wearer, as well as a capacitance between the BCT 225 and a non-conducting portion of the wearable computing device. The level of capacitance sensed or detected from the conductive portion of the BCT frame 215 may be received by the capacitive sensor controller 230. After receiving the level of capacitance sensed or detected, capacitive sensor controller 230 may compare the received level of capacitance to a threshold capacitance level. Based on the comparison, the capacitive sensor controller 230 may provide an indication to HMD 102 or 152. For example, the capacitive sensor controller 230 may provide an indication that HMD 102 or 152 is worn.

The micro-coaxial cable 220 may be arranged such that capacitive sensing data provided by the conductive portion of the BCT frame 215 is isolated from the audio signal that drives BCT 225. An outer shield of micro-coaxial cable 220 may also be grounded to limit the capacitive sensing or detection area or prevent the micro-coaxial cable 220 from interfering with the conductive portion of the BCT frame 215 from sensing a level of capacitance. Additionally, a weatherproof housing 210 may be used to protect the capacitive sensor controller 230, BCT frame 215, and BCT 225 from erroneous detections or false triggers that may occur from atmospheric conditions.

The capacitive sensor controller 230 may be integrated in side-arms 114 or 116 of HMD 102 in FIG. 1A. However, capacitive sensor controller 230 may be integrated in other parts of HMD 102 as well. Further, integrating more than one capacitive sensor controller in HMD 102 is possible.

Figure 3A:
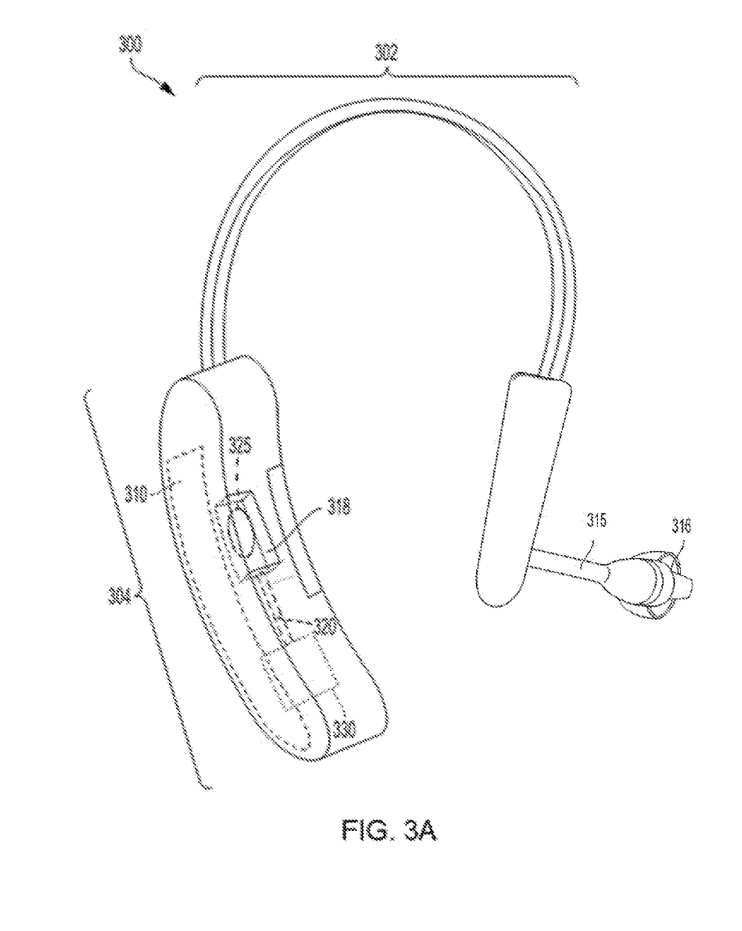
FIG. 3A, FIG. 3B, and FIG. 3C illustrate wearable computing devices in the form of earpiece devices, in accordance with example embodiments.
Figure 3B:
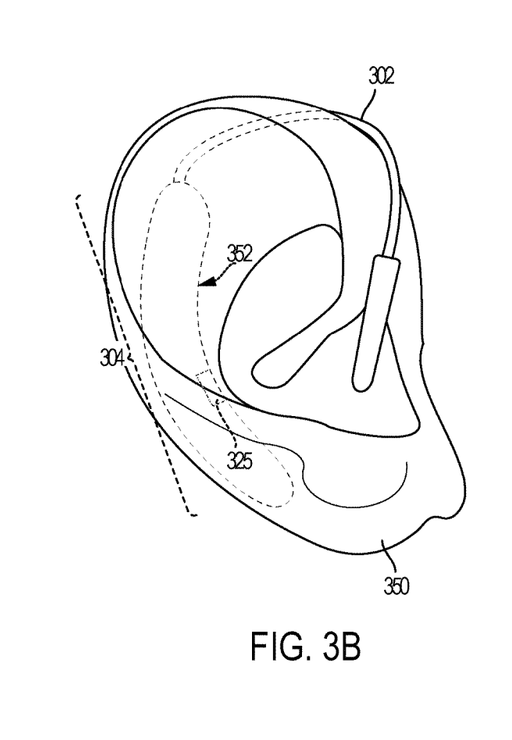
Figure 3C:
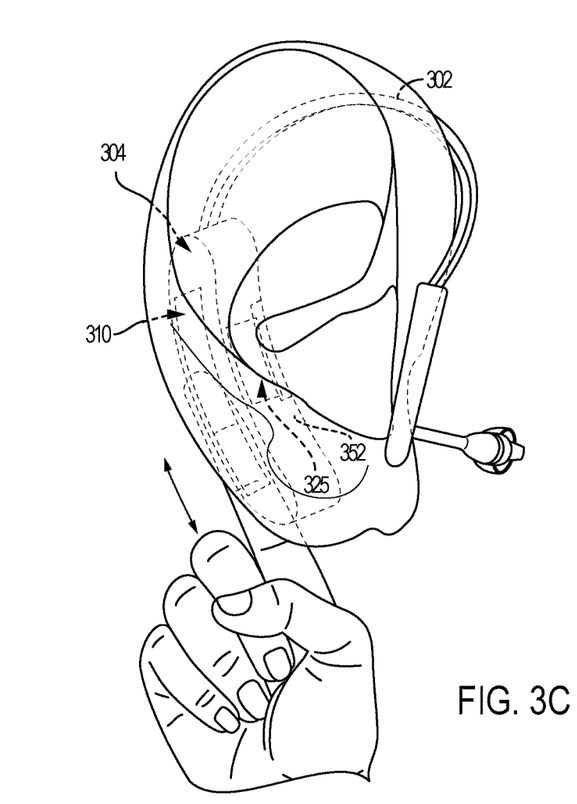

FIG. 3A to 3C show another wearable computing device according to an example embodiment. More specifically, FIG. 3A to 3C show an earpiece device 300, which includes an earpiece frame 302 and a behind-ear housing 304. As shown in FIG. 3B, the earpiece frame 302 is curved, and is shaped so as to hook over a wearer's ear 350. When hooked over the wearer's ear 350, the behind-ear housing 304 is located behind the wearer's ear. For example, in the illustrated configuration, the behind-ear housing 304 is located behind the auricle, such that a surface 352 of the behind-ear housing 304 contacts the wearer on the back of the auricle (e.g., behind the pinna). In such a configuration, the BCT may contact the skin covering a wearer's bone and/or cartilage on the posterior side of the auricle.

Note that the behind-ear housing 304 may be partially or completely hidden from view, when the wearer of earpiece device 300 is viewed from the side. As such, an earpiece device 300 may be worn more discretely than other bulkier and/or more visible wearable computing devices.

Referring back to FIG. 3A, the behind-ear housing 304 may include a BCT 325 that is coupled to a BCT frame 318, and a touch pad 310. BCT 325 may be, for example, a vibration transducer or an electroacoustic transducer that produces sound in response to an electrical audio signal input. As such, BCT 325 may function as a bone-conduction speaker that plays audio to the wearer by vibrating the wearer's bone structure. Other types of BCTs are also possible. Generally, a BCT may be any structure that is operable to directly or indirectly vibrate the bone structure of the wearer.

The BCT frame 318 may be rigid and may hold BCT 325, a flexible pad (not shown) of the BCT 325, and additional components of BCT 325 together. The BCT frame 318 or a portion of the BCT frame 318 may be constructed with any conductive material, such as steel, alloy, aluminum, or iron, among others. The BCT frame 318 may be positioned in a center portion of the behind-ear housing 304. However, BCT frame 318 may be positioned in other parts of behind-ear housing 304 such that the BCT frame 318 contacts the wearer or is in close proximity with the wearer.

The behind-ear housing 304 may further include a micro-coaxial cable 320 that couples a capacitive sensor controller 330 to the conductive portion of the BCT frame 318. Capacitive sensor controller 330 is configured and functions similarly to capacitive sensor controller 230 in FIG. 2. As such, by coupling the conductive portion of the BCT frame 318 to the capacitive sensor controller 330, the conductive portion of the BCT frame 318 may sense a level of capacitance between the BCT 325 (or the conductive portion of the BCT frame 318) and a surrounding medium, such as air and/or a nearby conductor, such as a head of a wearer, as well as a capacitance between the BCT 325 and a non-conducting portion of the earpiece device 300.

The capacitive sensor controller 330 may be integrated in a lower portion of the behind-ear housing 304. However, capacitive sensor controller 330 may be integrated in other parts of the behind-ear housing 304. Further, integrating more than one capacitive sensor controller in the behind-ear housing 304 is possible.

As shown in FIG. 3C, BCT 325 may be arranged on or within the behind-ear housing 304 such that when the earpiece device 300 is worn, BCT 325 is positioned posterior to the wearer's ear, in order to vibrate the wearer's bone structure. More specifically, BCT 325 may form at least part of, or may be vibrationally coupled to the material that forms, surface 352 of behind-ear housing 304. Further, earpiece device 300 may be configured such that when the device is worn, surface 352 or a flexible pad (not shown) of the BCT is pressed against or contacts the back of the wearer's ear. As such, BCT 325 may transfer vibrations to the wearer's bone structure via surface 352 or the flexible pad of the BCT. Other arrangements of a BCT on an earpiece device are also possible.

As shown in FIG. 3C, the touch pad 310 may arranged on a surface of the behind-ear housing 304 that curves around behind a wearer's ear (e.g., such that the touch pad is generally faces towards the wearer's posterior when the earpiece device is worn). Other arrangements are also possible.

In some embodiments, touch pad 310 may be a one-dimensional or linear touchpad, which is capable of sensing touch at various points on the touch surface, and of sensing linear movement of a finger on the touch pad (e.g., movement upward or downward on the back of the behind-ear housing 304). In other embodiments, touch pad 310 may be a two-dimensional touch pad that is capable of sensing touch in any direction on the touch surface. Additionally, in some embodiments, touch pad 310 may be configured for near-touch sensing, such that the touch pad can sense when a wearer's finger is near to, but not in contact with, the touch pad. Further, in some embodiments, touch pad 310 may be capable of sensing a level of pressure applied to the pad surface.

In the illustrated embodiment, earpiece device 300 also includes a microphone arm 315, which may extend towards a wearer's mouth. Microphone arm 315 may include a microphone 316 that is distal from the earpiece. Microphone 316 may be an omni-directional microphone or a directional microphone. Further, an array of microphones could be implemented on a microphone arm 315. Alternatively, a bone conduction microphone (BCM), could be implemented on a microphone arm 315. In such an embodiment, the arm 315 may be operable to locate and/or press a BCM against the wearer's face near or on the wearer's jaw, such that the BCM vibrates in response to vibrations of the wearer's jaw that occur when they speak. Note that the microphone arm is 315 is optional, and that other configurations for a microphone are also possible. Further, in some embodiments, microphone arm 315 may be a removable component, which can be attached and detached from the earpiece device by the user.

In some embodiments, a wearable device may include two types of microphones: one or more microphones arranged specifically to detect speech by the wearer of the device, and one or more microphones that are arranged to detect sounds in the wearer's environment (perhaps in addition to the wearer's voice). Such an arrangement may facilitate intelligent processing based on whether or not audio includes the wearer's speech.

In some embodiments, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented a removable (e.g., modular) component, which can be attached and detached from the earpiece device by the wearer.

4. EXAMPLE COMPUTING DEVICES

Figure 4:
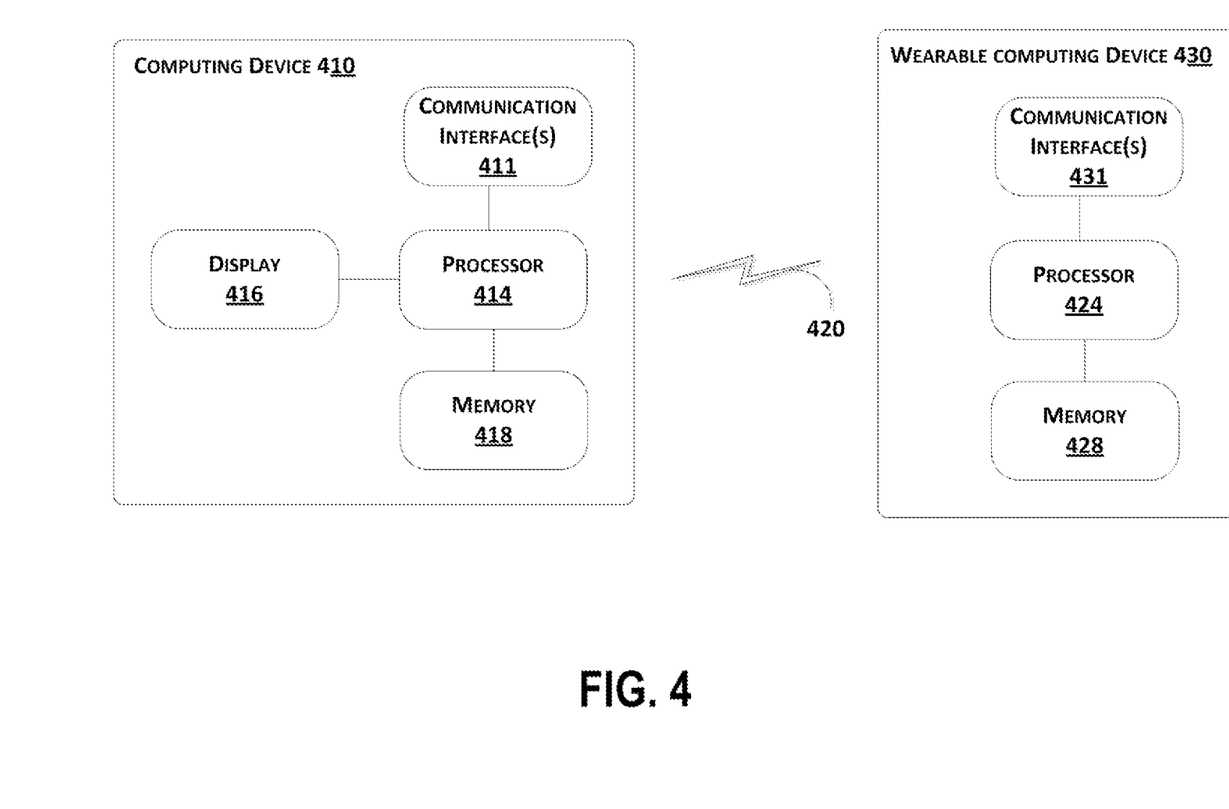
FIG. 4 is a block diagram showing components of a computing device and a wearable computing device, according to an example embodiment.

FIG. 4 is a block diagram showing basic components of a computing device 410 and a wearable computing device 430, according to an example embodiment. In an example configuration, computing device 410 and wearable computing device 430 are operable to communicate via a communication link 420 (e.g., a wired or wireless connection). Computing device 410 may be any type of device that can receive data and display information corresponding to or associated with the data. For example, the computing device 410 may be a mobile phone, a tablet computer, a laptop computer, a desktop computer, or an in-car computer, among other possibilities. Wearable computing device 430 may be a wearable computing device such as those described in reference to FIGS. 1A, 1B, 3A, 3B, and 3C, a variation on these wearable computing devices, or another type of wearable computing device altogether.

The wearable computing device 430 and computing device 410 include hardware and/or software to enable communication with one another via the communication link 420, such as processors, transmitters, receivers, antennas, etc. In the illustrated example, computing device 410 includes one or more communication interfaces 411, and wearable computing device 430 includes one or more communication interfaces 431. As such, the wearable computing device 430 may be tethered to the computing device 410 via a wired or wireless connection. Note that such a wired or wireless connection between computing device 410 and wearable computing device 430 may be established directly (e.g., via Bluetooth), or indirectly (e.g., via the Internet or a private data network).

In a further aspect, note that while computing device 410 includes a graphic display system 416, the wearable computing device 430 does not include a graphic display. In such a configuration, wearable computing device 430 may be configured as a wearable audio device, which allows for advanced voice control and interaction with applications running on another computing device 410 to which it is tethered.

As noted, communication link 420 may be a wired link, such as a universal serial bus or a parallel bus, or an Ethernet connection via an Ethernet port. A wired link may also be established using a proprietary wired communication protocol and/or using proprietary types of communication interfaces. The communication link 420 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 420, computing device 410 and wearable computing device 430 may each include one or more communication interface(s) 411 and 431 respectively. The type or types of communication interface(s) included may vary according to the type of communication link 420 that is utilized for communications between the computing device 410 and the wearable computing device 430. As such, communication interface(s) 411 and 431 may include hardware and/or software that facilitates wired communication using various different wired communication protocols, and/or hardware and/or software that facilitates wireless communications using various different wired communication protocols.

Computing device 410 and wearable computing device 430 include respective processing systems 414 and 424. Processors 414 and 424 may be any type of processor, such as a micro-processor or a digital signal processor, for example. Note that computing device 410 and wearable computing device 430 may have different types of processors, or the same type of processor. Further, one or both of computing device 410 and a wearable computing device 430 may include multiple processors.

Computing device 410 and a wearable computing device 430 further include respective on-board data storage, such as memory 418 and memory 428. Processors 414 and 424 are communicatively coupled to memory 418 and memory 428, respectively. Memory 418 and/or memory 428 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, the data storage can be implemented using a single physical device (e.g., one optical, magnetic, organic or other memory or disc storage unit), while in other implementations, the data storage can be implemented using two or more physical devices.

Memory 418 can store machine-readable program instructions that can be accessed and executed by the processor 414. Similarly, memory 428 can store machine-readable program instructions that can be accessed and executed by the processor 424.

In an exemplary embodiment, memory 418 may include program instructions stored on a non-transitory computer-readable medium and executable by the at least one processor to cause the computing device 410 to perform the example method described herein.

4. EXAMPLE METHOD

Figure 5:
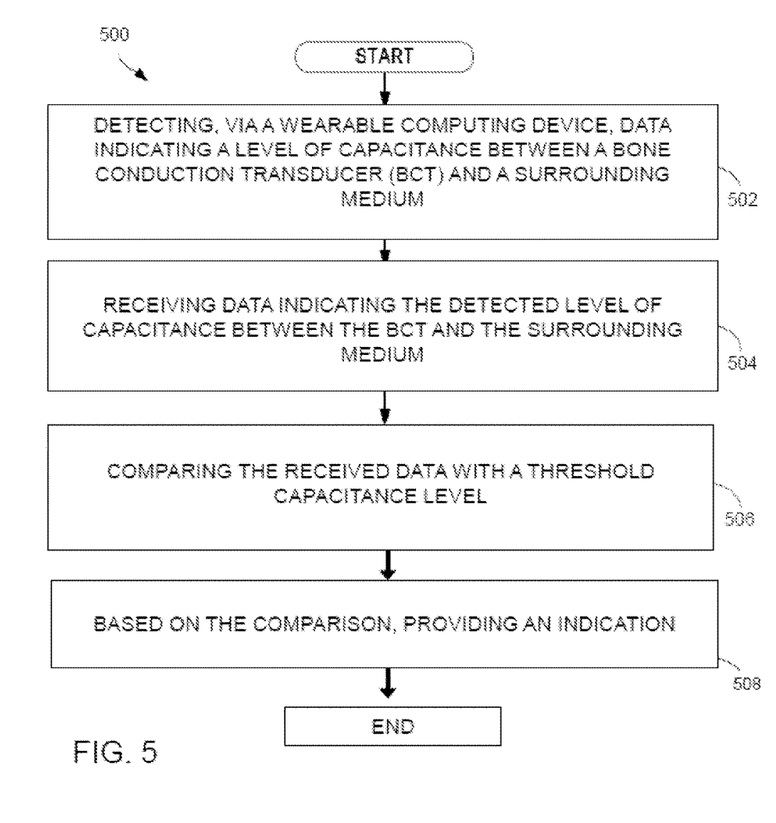
FIG. 5 is a flow chart illustrating a method, in accordance with an example embodiment.

FIG. 5 is a flowchart illustrating a method 500, in accordance with an example embodiment. Method 500 shown in FIG. 5 could be used with any of the wearable computing devices described herein or with wearable computing devices that are differently configured. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time, including register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 500 and other processes and methods disclosed herein, each block may represent circuitry that is wired to perform the specific logical functions in the process.

As shown, the method 500 begins at block 502 where a wearable computing device detects data indicating a level of capacitance between a BCT and a surrounding medium. For example, the wearable computing device may comprise a capacitive sensor controller that is coupled to a conductive portion of a BCT frame. The conductive portion of the BCT frame may periodically detect data indicating values of sensed capacitances from a surrounding medium, such as air and/or a nearby conductor, such as a head of a wearer, as well as a capacitance between the BCT and a non-conducting portion of the wearable computing device. The data may, for example, indicate a value of the sensed capacitance (e.g., in farads). Alternatively, the data may indicate a value (e.g., in volts), that represents a value of the sensed capacitance.

At block 504, the wearable computing device receives data indicating the level of capacitance between the BCT and the surrounding medium. For example, a conductive portion of a BCT frame may be coupled to a capacitive sensor controller that receives data indicating the detected level of capacitance.

At block 506, the wearable computing device compares the received data and a threshold capacitance level. The threshold capacitance level may take a number of forms. For example, the threshold capacitance level may be greater than a typical level of capacitance due to environmental changes (e.g., changes in humidity). As another example, the threshold capacitance level may be approximately equal to a measured level of capacitance while a wearer contacts the BCT of the wearable computing device. As yet another example, the threshold capacitance level may be approximately equal to a measured level of capacitance while a wearer with dry skin or an active wearer with wet skin contacts the BCT of the wearable computing device. The threshold capacitance level may take other forms as well.

The comparison between the received data and the threshold capacitance level may involve, for example, determining whether the received data is greater than or equal to (e.g., in magnitude) threshold capacitance level. The comparison may take other forms as well.

The method 500 continues at block 508 where, based on the comparison, the wearable computing device provides an indication. For example, a capacitive sensor controller of the wearable computing device may provide the indication that the wearable computing device is donned. In such case, the indication may cause the wearable computing device to operate in a first state. As another example, the capacitive sensor controller may provide the indication that the wearable computing device is doffed. In such case, the indication may cause the wearable computing device to operate in a second state. The wearable computing device may be said to be donned when the wearable computing device is proximate to a head of a wearer. Similarly, the wearable computing device may be said to be doffed when the wearable computing device is not proximate to a head of a wearer.

The proximity of the wearable computing device to a head of a wearer may be determined based on the comparison. For example, in embodiments where the threshold capacitance level is greater than a typical level of capacitance due to environmental changes and the comparison indicates that the received data is greater than the threshold capacitance level, the wearable computing device may determine that the wearable computing device has gone from being doffed to being donned, or vice versa.

The wearable computing device may consume less power in the second state than in the first state. For example, a display of the wearable computing device may be on in the first state and off in the second state. As another example, more components of the wearable computing device may be on in the first state than in the second state. As yet another example, the wearable computing device may sense inputs on a touchpad in the first state and not in the second state. As still another example, the wearable computing device may output audio, visual, and/or haptic notifications (e.g., of incoming communications) in the first state and not in the second state. Other examples are possible as well.

While the embodiments above described a comparison between the received data indicating the detected level of capacitance and a threshold capacitance level, other comparisons may be made in other embodiments.

For example, in some embodiments, a comparison may be made between a sensed level of capacitance received from the BCT and a reference capacitance. That is, the capacitance sensed by the BCT may be compared with the reference capacitance. The reference capacitance may take a number of forms. For example, the reference capacitance may be determined based on a capacitance of a head of a wearer. For instance, the reference capacitance may be an average capacitance of a human head, an average capacitance of a number of wearers' heads, or a predetermined (e.g., premeasured) capacitance of a particular wearer's head. As another example, the reference capacitance may be determined based on a capacitance sensed while the wearable computing device is donned. For instance, the reference capacitance may be a predetermined (e.g., premeasured) capacitance of a particular wearer's head when the wearable computing device is donned. As still another example, the reference capacitance may be determined based on a capacitance sensed while the wearable computing device is doffed. The reference capacitance may be fixed or may be adaptive (e.g., may be modified by the wearable computing device over time in response to, for instance, sensed environmental conditions). The reference capacitance may take other forms as well.

Depending on the reference capacitance, the comparison of the sensed capacitance and the reference capacitance may take several forms. For example, in embodiments where the reference capacitance is an average capacitance of a human head or a predetermined capacitance of a particular user's head when the wearable computing device is donned, the wearable computing device may compare the sensed capacitance and the reference capacitance to determine whether the sensed capacitance is approximately equal to (e.g., within a predetermined threshold of) the reference capacitance. As another example, in embodiments where the reference capacitance is a predetermined capacitance of a particular user's head when the wearable computing device is doffed, the wearable computing device may compare the sensed capacitance and the reference capacitance to determine whether the sensed capacitance greater than the reference capacitance. The comparison may take other forms as well.

It will be understood that the example implementation described above is merely illustrative and is not meant to be limiting. In particular, wearable computing devices, BCTs, capacitive sensor controllers, threshold capacitance levels, and states other than those described above are possible as well.

5. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A wearable computing device comprising:
   a bone conduction transducer (BCT) comprising a transducer coupled to a BCT frame, wherein the BCT is configured to receive and be driven by an audio signal, wherein the BCT frame couples the BCT to a component of the wearable computing device, wherein the BCT frame is rigid and holds the transducer such that when the transducer is driven by the audio signal, vibration of the transducer is transferred to a wearer when the wearable computing device is worn, and wherein at least a portion of the BCT frame that holds the transducer is conductive so as to capacitively couple the BCT to a wearer when the wearable computing device is worn;
   a capacitive sensor controller; and
   at least one connective component that further couples the conductive portion of the BCT frame to the capacitive sensor controller, wherein the BCT coupled to the conductive portion of the BCT frame detects a level of capacitance between the BCT and a surrounding medium.

2. The device of claim 1, wherein the at least one connective component is arranged to isolate the detected level of capacitance and the audio signal that drives the BCT.

3. The device of claim 1, wherein the capacitive sensor controller is configured to:
   receive data indicating the detected level of capacitance between the BCT and the surrounding medium;
   compare the received data with a threshold capacitance level; and
   based on the comparison, provide an indication to the wearable computing device.

4. The capacitive sensor controller of claim 3, wherein the capacitive sensor controller is configured to provide the indication that the wearable computing device is donned, and wherein the indication causes the wearable computing device to operate in a first state.

5. The capacitive sensor controller of claim 3, wherein the capacitive sensor controller is configured to provide the indication that the wearable computing device is doffed, wherein the indication causes the wearable computing device to operate in a second state, and wherein the wearable computing device consumes less power in the second state than in the first state.

6. The device of claim 3, wherein the capacitive sensor controller configured to compare the received data with the threshold capacitance level comprises the capacitive sensor controller determining that the received data is greater than or equal to the threshold capacitance level.

7. The device of claim 3, wherein the threshold capacitance level is greater than a level of capacitance corresponding to capacitive coupling between the BCT and naturally-occurring environmental mediums.

8. The device of claim 3, wherein the wearable computing device is operable to: (a) provide notifications in the first state and (b) refrain from providing notifications in the second state.

9. The device of claim 3, wherein the wearable computing device is operable to: (a) sense inputs on a touchpad in the first state and (b) refrain from sensing inputs on the touchpad in the second state.

10. The device of claim 1, wherein a weatherproof housing protects the capacitive sensor controller, the conductive frame, and the BCT.

11. The device of claim 1, wherein the conductive portion of the frame is constructed with steel, alloy, aluminum, or iron.

12. A method comprising:
  detecting, via a wearable computing device, data indicating a level of capacitance between a bone conduction transducer (BCT) and a surrounding medium, wherein the wearable computing device comprises:
    (1) the BCT comprising a transducer coupled to a BCT frame, wherein the BCT is configured to receive and be driven by an audio signal, wherein the BCT frame couples the BCT to a component of the wearable computing device, wherein the BCT frame is rigid and holds the transducer such that vibration of the transducer when driven by the audio signal is transferred to a wearer when the wearable computing device is worn, and wherein at least a portion of the BCT frame that holds the transducer is conductive so as to capacitively couple the BCT to a wearer when the wearable computing device is worn;
    (2) a capacitive sensor controller; and
    (3) at least one connective component that further couples the conductive portion of the BCT frame to the capacitive sensor controller;
  receiving data indicating the detected level of capacitance between the BCT and the surrounding medium;
  comparing the received data with a threshold capacitance level; and
  based on the comparison, providing an indication.

13. The method of claim 12, wherein providing the indication further comprises providing the indication that the wearable computing device is donned, and wherein the indication causes the wearable computing device to operate in a first state.

14. The method of claim 12, wherein providing the indication further comprises providing the indication that the wearable computing device is doffed, wherein the indication causes the wearable computing device to operate in a second state, and wherein the wearable computing device consumes less power in the second state than in the first state.

15. The method of claim 12, wherein comparing the received data with the threshold capacitance level further comprises determining that the received data is greater than or equal to the threshold capacitance level.

16. The method of claim 12, wherein the threshold capacitance level is greater than a level of capacitance corresponding to capacitive coupling between the BCT and naturally-occurring environmental mediums.

17. The method of claim 12, wherein the wearable computing device is operable to: (a) provide notifications in the first state and (b) refrain from providing notifications in the second state.

18. A non-transitory computer readable storage medium having stored therein instructions, that when executed by a wearable computing device, cause the wearable computing device to perform functions comprising:
  detecting data indicating a level of capacitance between a bone conduction transducer (BCT) and a surrounding medium, wherein the wearable computing device comprises:
    (1) the BCT comprising a transducer coupled to a BCT frame, wherein the BCT is configured to receive and be driven by an audio signal, wherein the BCT frame couples the BCT to a component of the wearable computing device, wherein the BCT frame is rigid and holds the transducer such that vibration of the transducer when driven by the audio signal is transferred to a wearer when the wearable computing device is worn, and wherein at least a portion of the BCT frame that holds the transducer is conductive so as to capacitively couple the BCT to a wearer when the wearable computing device is worn;
    (2) a capacitive sensor controller; and
    (3) at least one connective component that further couples the conductive portion of the BCT frame to the capacitive sensor controller;
  receiving data indicating the detected level of capacitance between the BCT and the surrounding medium;
  comparing the received data with a threshold capacitance level; and
  based on the comparison, providing an indication.

19. The non-transitory computer readable storage medium of claim 18, wherein providing the indication further comprises providing the indication that the wearable computing device is donned, and wherein the indication causes the wearable computing device to operate in a first state.

20. The non-transitory computer readable storage medium of claim 18, wherein providing the indication further comprises providing the indication that the wearable computing device is doffed, wherein the indication causes the wearable computing device to operate in a second state, and wherein the wearable computing device consumes less power in the second state than in the first state.

* * * * *